(12) United States Patent
Shah et al.

(10) Patent No.: US 11,078,119 B2
(45) Date of Patent: Aug. 3, 2021

(54) COMPOSITES OF SINTERED MULLITE REINFORCED CORUNDUM GRANULES AND METHOD FOR ITS PREPARATION

(71) Applicant: ASHAPURA MINECHEM LTD., Mumbai (IN)

(72) Inventors: Chetan Navnitlal Shah, Mumbai (IN); Manan Chetan Shah, Mumbai (IN); Amit Chatterjee, Mumbai (IN); Anurag Tilak, Mumbai (IN)

(73) Assignee: ASHAPURA MINECHEM LTD., Mumbai (IN)

( * ) Notice: Subject to any disclaimer, the term of this patent is extended or adjusted under 35 U.S.C. 154(b) by 0 days.

(21) Appl. No.: 16/000,192

(22) Filed: Jun. 5, 2018

(65) Prior Publication Data

US 2018/0282223 A1 Oct. 4, 2018

Related U.S. Application Data

(63) Continuation-in-part of application No. 15/310,681, filed as application No. PCT/IB2015/058028 on Oct. 19, 2015, now abandoned.

(30) Foreign Application Priority Data

Oct. 23, 2014 (IN) .......................... 1448/MUM/2014

(51) Int. Cl.
*C04B 33/24* (2006.01)
*C04B 35/117* (2006.01)
(Continued)

(52) U.S. Cl.
CPC .............. *C04B 33/24* (2013.01); *C04B 33/04* (2013.01); *C04B 33/131* (2013.01);
(Continued)

(58) Field of Classification Search
CPC ... C04B 33/24; C04B 33/1305; C04B 33/131; C04B 33/1315; C04B 35/117;
(Continued)

(56) References Cited

U.S. PATENT DOCUMENTS 4,043,862 A 8/1977 Roberts
4,935,390 A 6/1990 Horiuchi et al.
(Continued)

FOREIGN PATENT DOCUMENTS

CN 1669980 9/2005
CN 1872796 12/2006
(Continued)

OTHER PUBLICATIONS

Wikpedia (Ceramic Flux—Wikipedia, the Free Encyclopedia, Sep. 21, 2014, web.archive.org/web/20140921050440/http://en.wikipedia.org/wiki/Ceramic_flux, hereinafter, Wikipedia (Year: 2014).*
(Continued)

*Primary Examiner* — Alison L Hindenlang
*Assistant Examiner* — Andrés E. Behrens, Jr.
(74) *Attorney, Agent, or Firm* — Lathrop GPM LLP

(57) ABSTRACT

The present disclosure relates to a composite of sintered mullite reinforced corundum granules and a method for its preparation. The composite comprises mullite and corundum in an interlocking microstructure. The process for preparing the composite involves the steps of admixing the raw materials followed by sintering to obtain the composite comprising sintered mullite reinforced corundum granules.

2 Claims, 3 Drawing Sheets

(51) Int. Cl.
C04B 35/64 (2006.01)
C04B 33/04 (2006.01)
C04B 35/185 (2006.01)
C04B 33/13 (2006.01)
C04B 35/626 (2006.01)
C04B 35/63 (2006.01)
C04B 35/634 (2006.01)
C09K 8/80 (2006.01)

(52) U.S. Cl.
CPC ...... *C04B 33/1305* (2013.01); *C04B 33/1315* (2013.01); *C04B 35/117* (2013.01); *C04B 35/185* (2013.01); *C04B 35/6261* (2013.01); *C04B 35/62695* (2013.01); *C04B 35/6303* (2013.01); *C04B 35/6316* (2013.01); *C04B 35/63416* (2013.01); *C04B 35/63492* (2013.01); *C04B 35/64* (2013.01); *C09K 8/80* (2013.01); *C04B 2235/3217* (2013.01); *C04B 2235/3272* (2013.01); *C04B 2235/349* (2013.01); *C04B 2235/3463* (2013.01); *C04B 2235/5436* (2013.01); *C04B 2235/656* (2013.01); *C04B 2235/77* (2013.01); *C04B 2235/80* (2013.01); *C04B 2235/94* (2013.01); *C04B 2235/96* (2013.01)

(58) Field of Classification Search
CPC .......... C04B 35/6261; C04B 35/62695; C04B 35/6303; C04B 35/6316; C04B 35/63416; C04B 35/63492; C04B 35/64; C04B 2235/3217; C04B 2235/3463; C04B 2235/349; C04B 2235/656
See application file for complete search history.

(56) References Cited

U.S. PATENT DOCUMENTS

| | | | |
|---|---|---|---|
| 5,294,576 | A | 3/1994 | Mizushima et al. |
| 6,083,861 | A * | 7/2000 | Saruhan ............... C04B 35/185 501/128 |
| 2002/0117280 | A1 | 8/2002 | Howle |
| 2004/0025894 | A1 | 2/2004 | Beven et al. |
| 2008/0135245 | A1 * | 6/2008 | Smith .................... C04B 35/04 166/280.2 |
| 2014/0318799 | A1 * | 10/2014 | Moeller ............... E21B 43/267 166/335 |
| 2015/0344371 | A1 * | 12/2015 | Sorrell ............. C04B 35/62204 501/153 |

FOREIGN PATENT DOCUMENTS

| | | | | |
|---|---|---|---|---|
| CN | 101602605 | | 12/2009 | |
| CN | 101857448 | | 10/2010 | |
| CN | 102249655 | | 11/2011 | |
| CN | 103664205 | | 3/2014 | |
| CN | 104293338 | * | 9/2014 | ............ C04B 35/10 |
| JP | 2004292230 | | 10/2004 | |
| JP | 2006131437 | | 5/2006 | |

OTHER PUBLICATIONS

"p. 327, 4.6.1.1, ¶2, Lines 7-14." Mullite, by Hartmut Schneider and Sridhar Komarneni, Wiley-VCH, 2005. (Year: 2005).*

Kovalev, Serguei, et al. "Numerical Evaluation of Toughening by Crack-Face Grain Interlocking in Self-Reinforced Ceramics." Journal of the American Ceramic Society, vol. 83, No. 4, 2004, pp. 817-824., doi:10.1111/j.1151-2916.2000.tb01280.x. (Year: 1996).*

Kim, Byung-Hoon, and Yong-Han Na. "Fabrication of Fiber-Reinforced Porous Ceramics of Al2O3-Mullite and SiC-Mullite Systems." Ceramics International, vol. 21, No. 6, 1995, pp. 381-384., doi:10.1016/0272-8842(95)94461-i. (Year: 1995).*

Fromme, Robert. "Glaze & Clay Tutorial—6." Ceramics Web, Mar. 12, 2014, ceramicsweb.org/articles/glaze_tech/three_oxide_groups.html. (Year: 2014).*

CN104293338A (Jun. 9, 2014) (online machine translation), [Retrieved on Jul. 28, 2020], Retrieved from: Espacenet (Year: 2014).*

Hill, Adrian. "Understanding the Links Between Rheology and Particle Parameters." American Laboratory, Sep. 10, 2015, web. archive.org/web/20150910123407/www.americanlaboratory.com/913-Technical-Articles/35729-Understanding-the-Links-Between-Rheology-and-Particle-Parameters/. (Year: 2015).*

Zhang, Mei Jie, et al. "Fabrication and Characterization of Mullite Whisker-Reinforced Porous Refractory." Key Engineering Materials, vol. 336-338, 2007, pp. 1488-1490., doi:10.4028/www.scientific.net/kem.336-338.1488. (Year: 2007).*

"Compressive Strength." Wikipedia, Wikimedia Foundation, Sep. 23, 2014, web.archive.org/web/20140923195554/en.wikipedia.org/wiki/Compressive_strength. (Year: 2014).*

Wang, Zhi, et al. "Mullite Fiber Reinforced Alumina Ceramic Matrix Composites." Key Engineering Materials, vol. 368-372, 2008, pp. 710-712., doi:10.4028/www.scientific.net/kem.368-372.710. (Year: 2008).*

"Mill (Grinding)." Wikipedia, Wikimedia Foundation, Oct. 22, 2014, web.archive.org/web/20141022050212/en.wikipedia.org/wiki/Mill_(grinding). (Year: 2014).*

"Mesh and Micron Sizes." Industrial Specialties Mfg., Aug. 13, 2014, www.industrialspec.com/resources/mesh-and-micron-sizes/. (Year: 2014).*

* cited by examiner

COMPOSITES OF SINTERED MULLITE REINFORCED CORUNDUM GRANULES AND METHOD FOR ITS PREPARATION

RELATED APPLICATIONS

The present application is a continuation-in-part of U.S. patent application Ser. No. 15/310,681, filed Nov. 11, 2016, which is a national phase entry under 35 USC 371 of Patent Cooperation Treaty Application Number PCT/IB2015/058028, filed Oct. 19, 2015, which claims benefit of priority to India Patent Application Number 1448/MUM/2014, filed Oct. 23, 2014. Each of the aforementioned applications is incorporated herein by reference.

FIELD OF THE DISCLOSURE

The present disclosure relates to a composite material and a method for its preparation.

BACKGROUND

Mullite:

Mullite is a rare clay mineral with the chemical composition $3Al_2O_3 \cdot 2SiO_2$. It is produced artificially by using different sources of alumina and silica during various melting and firing processes and is used as a refractory material due to its high melting point of 1840° C. The sources of alumina and silica used for the purpose of manufacturing sintered mullite generally include different types of clays. Sintered mullite is a very well-known refractory product used for high temperature refractory applications in the form of bricks or castables.

Corundum:

Corundum is a crystalline form of aluminum oxide ($Al_2O_3$) with traces of iron, titanium and chromium. Sintered corundum constitutes another important category of refractory products. In terms of properties, corundum possesses a higher elastic constant as compared to mullite and therefore has superior properties.

Mullite and corundum may be used in refractory applications, where the material is required to retain its strength at high temperatures. However, the disadvantage of obtaining a pure corundum microstructure is that the source raw material has to be highly pure, which is very expensive. Further, sintering of such pure material requires a considerably high sintering temperature.

The disadvantage of pure sintered mullite is its reduced mechanical properties as compared to pure corundum.

Therefore, there is felt need of a composite material that has improved properties as compared to individual sintered mullite and sintered corundum, and wherein the disadvantages of sintered corundum and sintered mullite such as high cost and high sintering temperature are overcome.

Objects

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide a composite material which exhibits improved/enhanced properties such as tensile strength, compression resistance and density.

Another object of the present disclosure is to provide a method for preparing a composite material with reduced cost and which can be manufactured at lower sintering temperature and hence is cost effective and energy efficient.

Other objects and advantages of the present disclosure will be more apparent from the following description which is not intended to limit the scope of the present disclosure.

SUMMARY

The present disclosure provides a composite of sintered mullite reinforced corundum granules and a process for its preparation. The composite of sintered mullite reinforced corundum granules comprises 6 wt % to 80 wt % of mullite and 10 wt % to 90 wt % of corundum. The composite has an interlocking microstructure. The method for preparing the composite involves the step of admixing fine powders of at least one clay and at least one alumina ore having particle size less than 45 microns to obtain an admixture, granulating the admixture in the presence of at least one binder and optionally at least one additive to obtain granulated pellets and sintering the granulated pellets in the temperature range of 1300° C. to 1600° C. to obtain a composite comprising sintered mullite reinforced corundum granules. The particle size of the so obtained sintered mullite reinforced corundum granules ranges from 0.25 mm to 1.5 mm.

BRIEF DESCRIPTION OF THE ACCOMPANYING DRAWING

The process of the present disclosure will now be described with the help of the accompanying drawing, in which.

DETAILED DESCRIPTION

Figure 1:
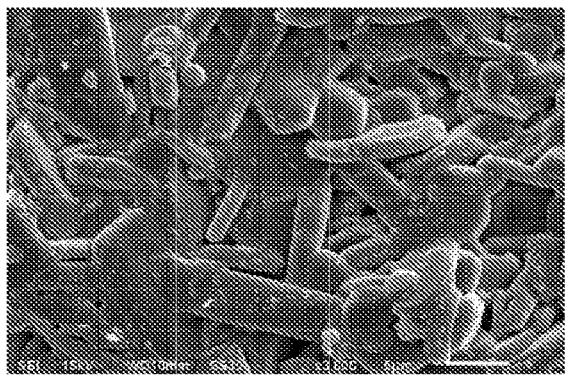
FIG. 1 illustrates an SEM image of rod shaped mullite entangled with hexagonal corundum.

The present disclosure envisages a composite material and a method for its preparation. The composite material in accordance with the present disclosure comprises a sintered mullite reinforced corundum granule which demonstrates improved properties such as improved sphericity, higher density and higher compression resistance as compared to the individual counterparts, i.e., sintered mullite and sintered corundum. The composite material of the present disclosure has compression resistance of less than 10%.

Further, the composite material of the present disclosure has acid solubility of less than 7%. Acid solubility indicates the resistance of granules to acid attack and erosion. Acid solubility procedures can be used to determine the suitability of granules for use in applications where the sintered mullite reinforced corundum granules may come into contact with acids. Acid solubility may be determined in terms of % weight loss, which refers to the difference in weight of the pellets before and after acid treatment.

In the absence of the selected raw materials and the optimized process parameters of the present disclosure, compression resistance can be above 10%, and acid solubility can be above 7%.

The composite of sintered mullite reinforced corundum granules of the present disclosure comprises 6 wt % to 80 wt % of mullite and 10 wt % to 90 wt % of corundum. The mullite and the corundum in the composite have an interlocking microstructure, which enhances strength of the composite. In the composite of the present disclosure, mullite can be obtained from Kaolin and corundum can be obtained from alumina ore.

In accordance with the present disclosure, the process for the preparation of the composite material is described below.

To carry out the process, raw materials are ground in a pulverizer and/or a classified mill to obtain ground raw materials. The raw materials comprise pre-determined weight proportions of at least one clay and at least one alumina ore. The clay and the alumina ore may be ground in a grinder separately to obtain fine powders of clay and alumina ore.

In accordance with one of the embodiments of the present disclosure, the particle size of the fine powder obtained after the step of grinding is less than 45 microns.

The obtained fine powder of clay and fine powder of alumina ore are mixed to form an admixture. In one exemplary embodiment, the mixing is carried out in an intensive mixer and granulator to obtain the desired admixture.

The amount of clay used in the admixture can range from 6 wt % to 80 wt %. The clay can be at least one selected from the group consisting of Kaolin, Dickite, Halloysite and the like. In one embodiment the clay is Kaolin.

The amount of alumina ore used in the process for preparing the admixture can range from 10 wt % to 90 wt %. In one embodiment, the alumina ore is at least one selected from bauxite and aluminum trihydroxide.

After the formation of an admixture, the process of granulation is carried out. Granulation may be carried out in the presence of at least one binder and optionally at least one additive to obtain granulated pellets.

The binder employed in the process of the present disclosure can be at least one selected from the group of organic binders and inorganic binders. Non-limiting examples of binders suitable for the process of the present disclosure can include bentonite, polyvinyl alcohol (PVA), corn starch, rice starch, sodium hexa metaphosphate, sodium silicate, dextrin, carboxymethyl cellulose (CMC), deionized water and the like.

The additive employed in the process of the present disclosure can include, but is not limited to, fluxing agents, sintering aids and the like. Non-limiting examples of fluxing agents suitable for the process of the present disclosure can include ceramic fluxing agents such as iron-ore slime, potash feldspar dolomite, calcite, or other sources which supply fluxing oxides. Inclusion of fluxing agents helps reduce required sintering temperature. Additionally, inclusion of potash feldspar dolomite in an amount in the range of 6 wt % to 18 wt % is capable of reducing the density and increasing the strength of the composite of sintered mullite reinforced corundum granules. In particular embodiments, the fluxing agent is in the form of amorphous glassy phase in the composite. Non-limiting examples of sintering aids suitable for the process of the present disclosure include mineral attapulgite, olivine or any other source of MgO, titania, zirconia, chromite, manganese ore and the like.

The binder and the additive can be added in amounts ranging from 1 wt % to 5 wt % and 1 wt % to 10 wt %, respectively.

The granulated admixture undergoes sintering in the temperature range of 1300° C. to 1600° C. to obtain a composite material comprising sintered mullite reinforced corundum granules having particle size ranging from 0.25 mm to 1.5 mm.

In accordance with one of the embodiments of the present disclosure, the clay and alumina ore are added in a pre-determined weight proportion so as to obtain the sintered mullite reinforced corundum granules having alumina content varying from 50 wt % to 85 wt %. The obtained admixture is then subjected to sintering at a pre-determined temperature to obtain a composite material comprising sintered mullite reinforced corundum granules. In accordance with one of the embodiments of the present disclosure, sintering is typically carried out in the temperature range of 1300° C. to 1600° C.

The composite material comprising sintered mullite reinforced corundum granules obtained in accordance with the process of the present disclosure is characterized by improved physicochemical properties including bulk density, specific gravity, compression resistance, acid solubility, roundness, and the like.

Figure 2:
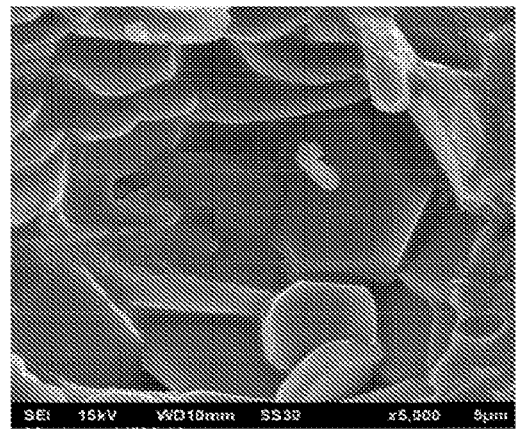
FIG. 2 illustrates an SEM image of hexagonal corundum.
Figure 3:
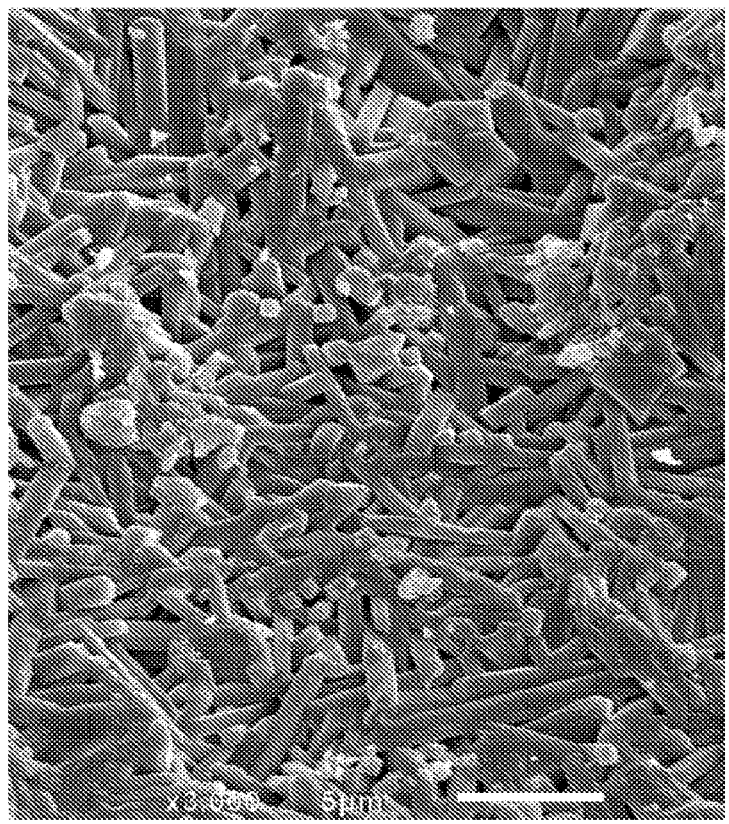
FIG. 3 illustrates an SEM image of mullite rods and corundum, having an interlocking microstructure.

Sintered mullite has elongated rod shaped structure (FIG. 1) and is therefore, advantageously utilized by the inventors of the present disclosure to reinforce or enhance the tensile strength of the composite material wherein long mullite crystals entangle with hexagonal corundum (FIG. 2), which increases the compressive strength of the composite. Further, the raw materials used in the process of the present disclosure are commonly available in the form of minerals and is therefore cost effective. Also the use of such combination of raw materials requires a considerably lower sintering temperature as compared to the sintering temperature required for the sintering of pure corundum. The sintered mullite reinforced corundum granules obtained from the method of the present disclosure have an interlocking microstructure (FIG. 3). The mullite rods entangle with the hexagonal shaped corundum, which helps in delaying fracture by arresting crack propagation during rigorous mechanical loading.

The composite material obtained in accordance with the process of the present disclosure finds extensive application including, but not limited to, their use in proppants, foundry, filter bed for molten metals and the like.

The present disclosure is further illustrated herein below with the help of the following experiments. The experiments used herein are intended merely to facilitate an understanding of ways in which the embodiments herein may be practiced and to further enable those of skill in the art to practice the embodiments herein. Accordingly, the examples should not be construed as limiting the scope of embodiments herein. The present disclosure is further described in light of the following experiments which are set forth for illustration purpose only and not to be construed for limiting the scope of the disclosure. These laboratory scale experiments can be scaled up to industrial/commercial scale.

Experimental Details

Experiment 1:

The raw materials (as given below) were individually crushed and ground to the desired particle size. The ground materials were then fed into an intensive mixer and granulator and thoroughly mixed for a duration of 2 minutes. Post mixing was done by adding 1% PVA (Polyvinyl alcohol as a binder) in the granulator to initiate and aid in granulation and binding of the individual particles. The binder forms an interface between the particles and aids in better compacted pellets. With time, an entire coalescence of particles takes place, resulting in fine spherical granules. The granules were then sintered at 1600° C. to obtain the composite of sintered mullite reinforced corundum granules having particle size ranging from 0.25 mm to 1.5 mm. The results are tabulated in Table 1.

Raw Materials & their ratio: Kaolin clay:Bauxite (85:15)
Particle size of raw materials: $d_{90}$—35 microns
Process: Granulation using an intensive mixer & granulator, and 1% PVA binder
Sintering temperature: 1600° C.

TABLE 1

| | Sintered composition: | | | | |
|---|---|---|---|---|---|
| S. no | % $Al_2O_3$ | % Mullite** | % Corundum** | Fired Density | % Breakage | % Wt loss* |
| 1 | 61 | 70 | 10 | 1.5 | <10 | 6 |

*Weight loss refers to the differenece in weight of the pellets before and after acid treatment.
**% Mullite & % Corundum is with reference to the crystalline phase of the composite granules.

Experiment 2:
The composite of sintered mullite reinforced corundum granules was prepared by the method as described in experiment 1 by altering the raw materials and the ratio of raw materials. The composite granules so obtained had particle size ranging from 0.25 mm to 1.5 mm.
  Raw Materials and their ratio: Kaolin Clay+Aluminium trihydrate (ATH) (70:30)
  Particle size of raw materials: $d_{90}$—33 microns
  Process: Granulation using an intensive mixer & granulator, and 1% PVA binder
  Sintering temperature: 1600° C.

TABLE 2

| | Sintered composition: | | | | |
|---|---|---|---|---|---|
| S. no | % $Al_2O_3$ | % Mullite | % Corundum | Fired Density | % Breakage | % Wt loss |
| 1 | 67 | 76 | 17 | 1.4 | <10 | 5.3 |

Experiment 3:
The composite of sintered mullite reinforced corundum granules was prepared by the method as described in experiment 1 by altering the raw materials and the ratio of raw materials. The experiment was carried out in the presence of an additive (Feldspar). The composite granules so obtained had particle size ranging from 0.25 mm to 1.5 mm.
  Raw Materials and their ratio: Kaolin Clay+ATH+Feldspar (60:30:10)
  Particle size of raw materials: $d_{90}$—37 microns
  Process: Granulation using an intensive mixer & granulator, and 1% PVA binder
  Sintering temperature: 1350-1450° C.

TABLE 3

| | Sintered composition: | | | | |
|---|---|---|---|---|---|
| S. no | % $Al_2O_3$ | % Mullite | % Corundum | Fired Density | % Breakage | % Wt loss |
| 1 | 59 | 70 | 13 | 1.35 | <10 | 7 |

Experiment 4:
The composite of sintered mullite reinforced corundum granules was prepared by the method as described in experiment 1 by altering the raw materials and the ratio of raw materials. The experiment was carried out in the presence of a binder (Bentonite) and additive (Iron ore slime). The composite granules so obtained had particle size ranging from 0.25 mm to 1.5 mm.
  Raw Materials and their ratio: Kaolin Clay+ATH+Bentonite+Iron ore slime (21:72:1.4:5.6)
  Particle size of raw materials: $d_{90}$<45 microns
  Process: Granulation using an intensive mixer & granulator, and 1% PVA binder
  Sintering temperature: 1350° C.

TABLE 4

| | Sintered composition: | | | | |
|---|---|---|---|---|---|
| S. no | % $Al_2O_3$ | % Mullite | % Corundum | Fired Density | % Breakage | % Wt loss |
| 1 | 82 | 33 | 67 | 1.5 | <10 | 6.5 |

Experiment 5:
The composite of sintered mullite reinforced corundum granules was prepared by the method as described in experiment 1 by altering the raw materials and the ratio of raw materials. The experiment was carried out in the presence of a binder (PVA). The composite granules so obtained had particle size ranging from 0.25 mm to 1.5 mm.
  Raw Materials and their ratio: Kaolin Clay+Calc.Bauxite (85:15)
  Particle size of raw materials: $d_{90}$<45 microns
  Process: Granulation using an intensive mixer & granulator, and 1% PVA binder
  Sintering temperature: 1600° C.

TABLE 5

| | Sintered composition: | | | | |
|---|---|---|---|---|---|
| S. no | % $Al_2O_3$ | % Mullite | % Corundum | Fired Density | % Breakage | % Wt loss |
| 1 | 63 | 75 | 11 | 1.65 | <10 | 7 |

Experiment 6:
The composite of sintered mullite reinforced corundum granules was prepared by the method as described in experiment 1 by altering the raw materials and the ratio of raw materials. The experiment was carried out in the presence of a binder (PVA) and additive (titania and zirconia). The composite granules so obtained had particle size ranging from 0.25 mm to 1.5 mm.
  Raw Materials and their ratio: 97.5% Calc Bauxite+0.5% Kaolin Clay+1% $TiO_2$+1% $ZrO_2$
  Particle size of raw materials: $d_{90}$<45 microns
  Process: Granulation using an intensive mixer & granulator, and 1% PVA binder
  Sintering temperature: 1500° C.

TABLE 6

| | Sintered composition: | | | | |
|---|---|---|---|---|---|
| S. no | % $Al_2O_3$ | % Mullite | % Corundum | Fired Density | % Breakage | % Wt loss |
| 1 | 85 | 6 | 90 | 2.1 | <10 | 5 |

Figure 4:
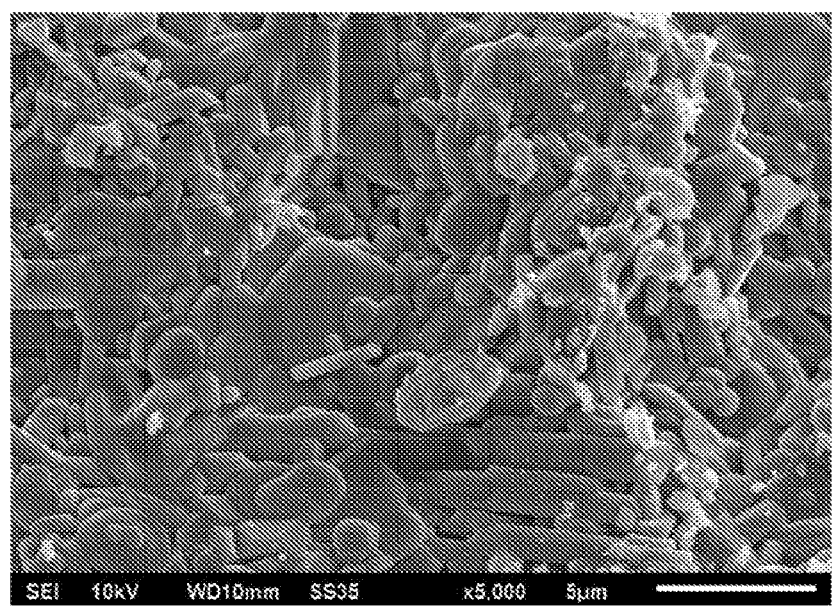
FIG. 4 illustrates an SEM image of mullite rods and corundum, having an interlocking microstructure and grain refinement.

An SEM image of the sintered composition of Experiment 6 is illustrated in FIG. 4. It is evident from the SEM image in FIG. 4 that the addition of zirconia leads to grain refinement, which in turn leads to better mechanical properties and specifically compression resistance. Besides, zirconia also induces good fracture toughness in the sintered mullite reinforced corundum granules.

Experiment 7:

The composite of sintered mullite reinforced corundum granules was prepared by the method as described in experiment 1 by altering the raw materials and the ratio of raw materials. The experiment was carried out in the presence of a binder (Starch). The composite granules so obtained had particle size ranging from 0.25 mm to 1.5 mm.

- Raw Materials and their ratio: 99% Calc Bauxite+1% Kaolin Clay
- Particle size of raw materials: $d_{90}$<45 microns
- Process: Granulation using an intensive mixer & granulator, and 1% Starch binder
- Sintering temperature: 1550° C.

TABLE 7

| | Sintered composition: | | | | |
|---|---|---|---|---|---|
| S. no | % $Al_2O_3$ | % Mullite | % Corundum | Fired Density | % Breakage | % Wt loss |
| 1 | 83 | 8 | 88 | 2 | <10 | 6.5 |

In the above experiments, the processing conditions like granulation, and sintering temperature have been closely controlled to achieve the desired properties. The quality of the pellets are predominantly governed by the granulation process.

The above experiments demonstrate that the composite material of the present disclosure has compression resistance of less than 10%, and acid solubility of less than 7%, indicating resistance to breakage and resistance to erosion.

Technical Advancements:

The process of the present disclosure described herein above has several technical advantages including but not limited to the realization of:

1. A composite material comprising sintered mullite reinforced corundum granules with improved properties including, but not limited to, density and compression resistance.
2. A simple and cost-efficient process for manufacturing a composite material comprising sintered mullite reinforced corundum granules.
3. A very simple and effective way of enhancing the resistance to crack propagation of the granules under load by reinforcing with mullite in a matrix of corundum of very high elastic constant.

The exemplary embodiments herein quantify the benefits arising out of this disclosure and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein has been described in terms of preferred embodiments, those skilled in the art will recognize that the embodiments herein can be practiced with modification within the spirit and scope of the embodiments as described herein.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

What is claimed is:

1. A method for preparing a composite of sintered mullite reinforced corundum granules comprising the following steps:
    a) grinding raw materials comprising at least one clay and at least one alumina source, to obtain ground raw materials having particle size less than 45 microns;
    b) admixing the ground raw materials to obtain an admixture;
    c) granulating the admixture in the presence of at least one binder and at least one fluxing agent to obtain granulated pellet; and
    d) sintering the granulated pellet in a temperature range of 1300° C. to 1600° C. to obtain the composite of sintered mullite reinforced corundum granules,
    wherein the binder is at least one selected from a group of binders consisting of bentonite, starch and polyvinyl alcohol;
    wherein the fluxing agent is selected from a group of fluxing agents consisting of potash feldspar and iron ore slime;
    wherein the mullite and the corundum in the composite have interlocking microstructure and said composite consists of 6 wt. % to 80 wt. % of mullite and 10 wt. % to 90 wt. % of corundum; and
    wherein said composite has a compression resistance of less than 10% and an acid solubility of less than 7%.

2. The method as claimed in claim 1, wherein the granulating is carried out optionally in the presence of at least one sintering aid selected from titania and zirconia.

* * * * *